Sept. 27, 1938.                M. KNOLL                 2,131,185
ELECTROOPTICAL DEVICE
Filed Feb. 24, 1936
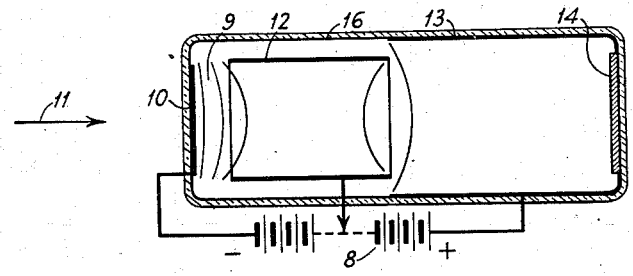
Fig. 1
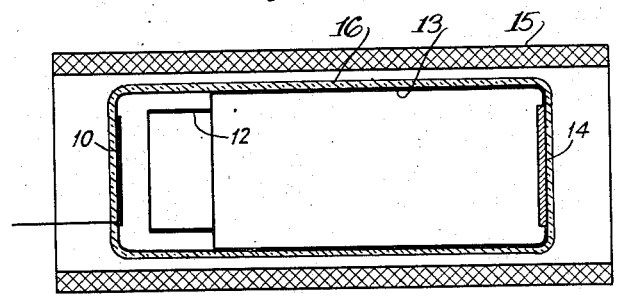
Fig. 2
Fig. 3
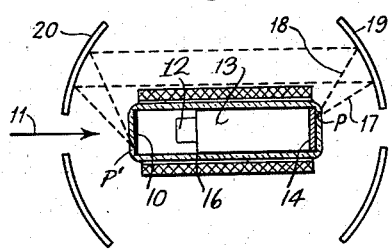
Fig. 4
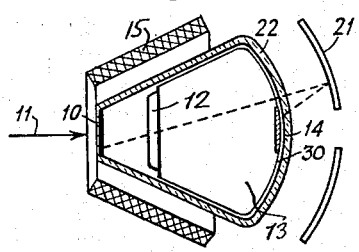
Fig. 5
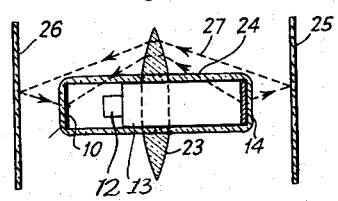
Fig. 6
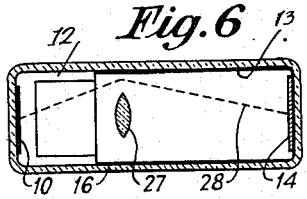
Fig. 7
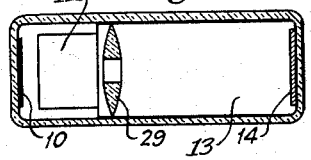
INVENTOR.
MAX KNOLL
BY  Charles McClair
ATTORNEY.

Patented Sept. 27, 1938

2,131,185

UNITED STATES PATENT OFFICE 2,131,185

ELECTROOPTICAL DEVICE

Max Knoll, Berlin, Germany, assignor to Telefunken Gesellschaft für Drahtlose Telegraphie m. b. H., Berlin, Germany, a corporation of Germany Application February 24, 1936, Serial No. 65,231
In Germany March 1, 1935

12 Claims. (Cl. 250—27.5)

My invention relates to light-sensitive devices and more particularly to an electron-optic phototube capable of high regenerative amplification.

In a conventional electron-optic device the electron currents produced are often of such a weak nature as to produce ineffective fluorescence on the viewing screen. In view of this fact the photo-electric currents often require amplification prior to impingement on the viewing screen.

It is the object of the present invention to provide an optical re-creation device capable of high amplification by means of photo-electric regeneration.

It is a further object of my invention to provide an optical re-creation device capable of photo-electric regeneration within the tube itself.

According to the invention these objects and others are accomplished by means of a fluorescent substance or material on a transparent or translucent viewing screen within the tube, whereby this substance is made to glow by the photo-electrons released by the impinging light projected on a suitable photo-emissive surface or photocathode, and redirecting a portion of the light for the purpose of electron regeneration.

The novel features which I believe to be characteristic of my invention are set forth with particularity in the appended claims, but the invention itself will best be understood by reference to the following description taken in connection with the accompanying drawing in which Figure 1 is a schematic representation of a phototube in section embodying the principle of my invention;

Figure 2 shows a phototube such as Figure 1 capable of high electron resolving power;

Figures 3, 4, 5, 6, and 7 show various modifications and adaptations of the invention.

Referring to Figure 1, 10 denotes a photocathode which is made permeable to light or to infra-red radiant energy so that a picture projected upon the photocathode in the direction indicated by the arrow 11 will cause the release of photo-electrons, the quantity of these electrons so released from each surface element of the photocathode being proportional to the brightness of the corresponding picture element or picture point. The photo-electrons after issuing from the cathode are subjected to the action of an electrical field which is set up between the cylindrical electrode 12 and the photocathode 10 by reason of the suitable potential between these elements provided by the source 8. A number of equipotential surfaces are set up between the photocathode and anode 12 as designated by the lines 9. By reason of the said field the electrons undergo acceleration and they enter into a second electrical field between the electrodes 12 and 13. The electrode 13 which has a positive potential in reference to electrode 12 and which is conductively connected with the light permeable conducting layer of the fluorescent screen 14 further accelerates the electrons which have emanated from the photocathode 10. The electrons thus fly towards the fluorescent screen 14 at high velocity and upon contact therewith create a fluorescent image which corresponds to the photo-optical or infra-red picture upon the photocathode. The electrode 13 conductively connected with the light permeable conducting layer of the fluorescent screen 14 also serves as an anode.

Figure 2 shows an arrangement which is similar to that of Figure 1 so far as the disposition of the photocathode, fluorescent screen, and the accelerating electrode 12 are concerned.

The electron condenser lens shown in Figure 2 consists of a magnetic coil 15 which is of a length equal to or greater than the distance between the cathode and fluorescent screen. By the action of this condensing coil 15 each point of the photocathode is imaged upon a point of the said fluorescent screen so that upon the latter there is created, just as in the case of Figure 1, an image corresponding exactly with the optical or infra-red picture upon the cathode. It has been found that if the coil 15 were made of substantially smaller length than the distance between the cathode and the fluorescent screen the ensuing image upon the said screen would be turned at an angle other than 180 degrees in reference to the pattern upon the cathode. In accordance with the invention the light created by the impact of the photo-electrons on the fluorescent screen 14 will be partially reflected to the photocathode 10 causing additional photoelectrons to be emitted and thus increasing the total electron current emanating from the said cathode.

The arrangement illustrated in Figures 3 to 7 serves the purpose of reflecting the fluorescent image onto the cathode by optical means and of causing it to register or coincide upon the same with the optical or infra-red picture originally projected upon the cathode. As a result the electron emission current of the cathode is reenforced with the consequence that also the fluorescent image will be enhanced in illumination and so will, in turn, the volume of light reflected onto the cathode. In this manner a very intense fluorescent image is produced without the necessity of employing a very high potential for the acceleration of the photo-electrons. For purpose of clarity only, the glass envelope 16 of the tube has been shown in Figure 3. This envelope with cathode 10 and fluorescent screen 14 may be designated in a similar manner to that shown in Figures 1 and 2. The electron optical image of the cathode may be affected in a way that is described by reference to Figures 1 and 2. For instance, from the point marked P upon the fluorescent screen there issue light rays 17 and 18 which are reflected from a parabolic mirror 19, whence they reach, in the form of roughly parallel pencils, the second parabolic mirror or reflector 20 by which they are in turn sent to the corresponding point P' of the cathode. Through an opening in the mirror 20 the optical or infra-red picture may be projected upon the photocathode while the fluorescent image on the screen 14 may be viewed through the aperture in the reflector 19. In the arrangement in Figure 3 electron optic imaging means must be used which will throw an image with transposed sides upon the fluorescent screen. In other words, an image which is turned through an angle of 180 degrees inasmuch as the parabolic reflectors 19 and 20 also cause a rotation of 180 degrees of the fluorescent screen image reflected to the cathode. Hence in the arrangement shown in Figure 3 as well as in the arrangements hereinafter to be described, it will be necessary to use a magnetic condensing lens having a length at least equal to the distance between the cathode and the screen inasmuch as only a coil of the length as stated will result in an electron optic pattern with exactly transposed sides.

The arrangement illustrated in Figure 4 comprises a glass envelope which is enlarged into a truncated cone in the direction of the fluorescent screen, the said glass envelope terminating at the screen end in a curved glass surface whose center of curvature is approximately at the center of the cathode. The acceleration and focusing of the cathode rays may be accomplished also in this modification in a way similar to that of Figures 1 and 2, electrodes 12 and 13 of Figure 1 and the electrode 12 and condenser coil 15 of Figure 2 being here made of a conical form similar to the envelope in Figure 4. The potential applied to the electron condensing lens must then be raised in comparison between cathode and anode as shown in Figure 1. The electrons issuing from cathode 10 in a manner similar to the foregoing, result in an image upon the fluorescent screen 14 and this image is reflected back onto the cathode by the aid of a single parabolic mirror 21. The curved glass surface 22 is coated with a light-permeable and conducting layer 30 to obviate disturbances which might possibly be caused by reason of stray electrons collecting on the fluorescent substance 14. By making the surface 22 curve about the center of the cathode it is possible to minimize distortion of the optical reflected image.

Figure 5 shows an arrangement in which the fluorescent screen is imaged or reflected onto the cathode by means of a lens 23 which is provided with a central aperture. If desired this may be accomplished in such a manner that the lens 23 will not image the screen directly upon the cathode as indicated by the light ray 24, but will rather produce an image upon a reflector 25, a further mirror 26 then being interposed between the lens 23 and the photocathode 10. The path of the rays in the last-mentioned case will then follow the line indicated as 27.

Figure 6 shows an arrangement in which the fluorescent screen is imaged by reflection upon the cathode by means of an objective lens 27 which is mounted within the tube 16, while the electron optic imaging of the cathode upon the fluorescent screen is insured by the cathode rays passing near or skirting the objective, one of such electron rays being indicated by the line 28.

A further modification of Figure 6 is shown in Figure 7 wherein a centrally apertured objective lens 29 is disposed within the tube. The electron optic image passes through the aperture in the objective lens while the optical image of the fluorescent screen passes through the marginal surfaces thereof.

In all of the modifications shown in Figures 3 to 7 it should be noted that the ratio of magnification of the electron optic lens and that of the photo-optic imaging means must be so chosen that the image of the fluorescent screen which is projected onto the cathode will be of the same size as the optic or infra-red picture originally thrown upon the cathode.

While I have indicated the preferred embodiments of my invention of which I am now aware, it will be apparent that my invention is by no means limited to the exact forms illustrated or to the use indicated, but that many variations may be made in the particular structure used and the purpose for which it is employed without departing from the scope of my invention as set forth in the appended claims.

What I claim as new is:

1. A photo-electric device having an envelope containing a photocathode, a tubular anode, a light-permeable fluorescent screen, an electromagnetic focusing coil enclosing said anode and of a length at least equal to the distance between the photocathode and fluorescent screen, and two oppositely disposed light-reflecting members exterior of the said envelope, one adjacent said photocathode and the other adjacent said fluorescent screen to reflect an image from said fluorescent screen to said photocathode.

2. A photo-electric device having an envelope in the form of a truncated cone terminating in a spherical wall having thereon a fluorescent material, a photocathode, an anode, a focal mirror adjacent said material and without the envelope whereby a portion of the light from the fluorescent material is reflected to the photocathode.

3. A photo-electric device having an envelope in the form of a truncated cone terminating at the larger end in a spherical wall and at the smaller end in a substantially flat wall, said spherical wall having thereon a light pervious conducting coating, a photocathode on said flat wall, an anode between said spherical wall and said flat wall, and a fluorescent screen between said spherical wall and said photocathode.

4. A photo-electric device having an envelope containing a photocathode, an anode, a light-permeable fluorescent screen and an optical lens between said photocathode and said fluorescent screen for directing light from said screen to said photocathode.

5. A photo-electric device having an envelope containing a photocathode, an anode, a light-permeable fluorescent screen and an apertured optical lens between said photocathode and said fluorescent screen and on the axis thereof for directing light from said screen to said photocathode.

6. A photoelectric device having an envelope containing a photocathode, a light permeable fluorescent screen within said envelope and facing said photocathode, a tubular anode within said envelope between said photocathode and said screen, an electromagnetic focusing coil enclosing said anode and of a length greater than the distance between the photocathode and the fluorescent screen, and two oppositely disposed light reflecting members exterior of the said envelope co-axial with said photocathode, tubular anode and fluorescent screen, one adjacent said photocathode and the other adjacent said fluorescent screen to reflect an image from said fluorescent screen to said photocathode.

7. A photoelectric device having an envelope containing a photocathode on which a primary optical image may be formed, an anode having a light permeable portion with a fluorescent surface, an electron focusing coil surrounding said envelope between said photocathode and said anode, and a pair of oppositely disposed light reflecting members to reflect an image from said fluorescent surface onto said photocathode in registry with said primary image.

8. A photoelectric device having an envelope containing a flat photocathode on which a primary optical image may be formed, a cup-shaped anode facing said cathode to collect an electron discharge originating at said cathode and having at the bottom a light permeable portion with a fluorescent surface, and a tubular anode between the rim of said cup-shaped anode and said cathode for directing in conjunction with said cup-shaped anode the electron discharge to produce on said surface a luminescent duplicate of the primary image on said cathode.

9. A photoelectric device having an envelope containing a flat photocathode on which a primary optical image may be formed, a flat fluorescent surface parallel to and facing said photocathode, a tubular anode adjacent the wall of said envelope and between said surface and said photocathode, and a second tubular anode coaxial with said first-mentioned anode and between said first-mentioned anode and said photocathode for directing in conjunction with said first-mentioned anode an electron discharge from said photocathode to produce on said surface a luminescent duplicate of the primary image on said photocathode.

10. A photoelectric device having an envelope enclosing a flat photocathode on which a primary optical image may be formed, a flat fluorescent surface opposite, facing and parallel with said photocathode, a tubular anode within said envelope of larger internal diameter than said fluorescent surface and extending from said fluorescent surface toward said photocathode, a second tubular anode of smaller diameter than and longitudinally coaxial with said first-mentioned anode between said first-mentioned anode and said photocathode for directing a discharge to produce on said surface a luminescent duplicate of the primary optical image on said photocathode and optical means comprising a mirror outside said envelope adjacent said surface to superimpose on said primary image a luminescent facsimile of the fluorescent image on said surface.

11. A photoelectric device having an envelope containing a flat photocathode on which a primary optical image may be formed, a flat fluorescent surface opposite, facing and parallel with said photocathode, an electron lens comprising two coaxial cylindrical anodes between said photocathode and said surface, a focusing coil surrounding said envelope between said photocathode and said surface for generating a magnetic field to produce on said surface an inverted luminescent image of said primary optical image, and optical means outside said envelope comprising two concave mirrors having common optical axes coincident with the longitudinal axes of said anodes, one of said mirrors being adjacent said photocathode and the other adjacent said fluorescent surface for superimposing on and in registry with said primary image an inverted image of said luminescent image on said surface.

12. A photoelectric device having an envelope containing a flat photocathode on which a primary optical image may be formed, a cup-shaped anode facing said cathode to collect an electron discharge originating at said cathode and having at the bottom a light permeable portion with a fluorescent surface, a tubular anode between the rim of said cup-shaped anode and said cathode for directing in conjunction with said cup-shaped anode the electron discharge to produce on said surface a luminescent duplicate of the primary image on said cathode, and optical means adjacent said cathode and said fluorescent surface for superimposing on and in registry with said primary image a luminescent facsimile of the fluorescent image on said fluorescent surface.

MAX KNOLL.